Figure 1:
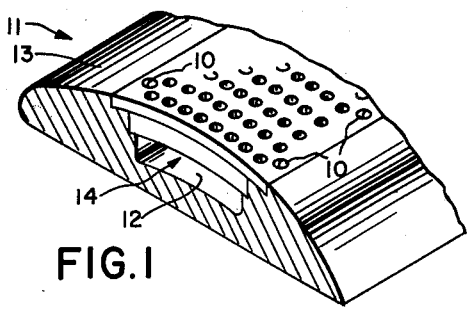

April 14, 1964 R. E. DANNENBERG 3,128,973
POROUS MATERIAL

Filed May 17, 1961 2 Sheets-Sheet 1

INVENTOR.
ROBERT E. DANNENBERG
BY George C. Limbach
ATTORNEY

INVENTOR.
ROBERT E. DANNENBERG
BY
*George C. Limbach*
ATTORNEY 3,128,973
POROUS MATERIAL
Robert E. Dannenberg, Palo Alto, Calif., assignor to Kendan Associates, Palo Alto, Calif., a partnership
Filed May 17, 1961, Ser. No. 110,738
8 Claims. (Cl. 244—130)

The present invention relates in general to porous materials and more particularly to uniform and variable permeability materials adapted for use in boundary layer control, in combustion chamber environments, in fluidizing conveyors and for blast wave protection.

With the advent of present day high speed vehicles, special problems have arisen with regard to controlling the flow of the boundary layer over the surface of a vehicle. Within the boundary layer, the flow velocity relative to the vehicle changes from zero at the surface of the vehicle to the velocity of the outer unaffected flow. The boundary layer on a vehicle is initially laminar. In an uncontrolled boundary layer there will be a transition from laminar flow to turbulent flow or a separation of the boundary layer from the vehicle surface resulting in increases in vehicle drag, loss of effective control forces between the vehicle and the flow, and increased skin temperatures. Sucking a certain amount of the boundary layer through a porous skin into the interior of the vehicle is an effective method of preventing flow separation, stabilizing or removing the boundary layer. Also, ejecting a fluid through the porous skin into the boundary layer offers a method of reducing skin temperatures, reducing friction drags and providing control force applications.

From an aerodynamic and hydrodynamic point of view, it is unsatisfactory to suck the boundary layer through a uniformly porous skin on a vehicle in motion since overflow will occur if at any point the suction becomes insufficient such that the static pressure inside the vehicle is higher than the minimum static pressure on the outside of the vehicle. Alternatively, if the suction inside the vehicle is too great, too much boundary layer may be removed by parts of the vehicle where the pressure differential between the exterior and the interior is greatest. And it has been observed that turbulence may even be created if the laminar boundary layer is thinned down too much.

The power required for suction is a function of the sucked quantity, the suction pressure necessary to induce the requisite flow through the porous skin, and the forward velocity of the vehicle. It has been known for some time that power requirements can be minimized by matching the permeability of the skin inversely with the pressure distribution over the outside of the vehicle; i.e., using a gradient distribution of permeability. The effects of both suction pressure and suction quantity are reduced by this means. In addition, minimum quantity pulled through the skin by suction results in a smaller size internal duct and lower over all weight penalty.

Even with the gradient arrangement of permeability in the porous skin, the suction power requirements increase roughly as the cube of the forward velocity of the vehicle. Safe design requires that the pump power and suction system be adequate for the "worst-off" design condition, and this usually imposes a severe weight and internal duct size penalty.

It is therefore desirable to provide a porous material that will satisfy requirements of structural stability and meet all the design parameters. Low drag installations require a hole or pore size somewhat less in diameter than the boundary layer thickness. Matching this requirement to the proper fluid permeability rules out most of the materials available for boundary layer control. Adding the requirements of strength, freedom from clogging and a durable surface for service operations restricts available materials still further.

Prior porous materials and especially materials adapted to provide a variable permeability have been proven to be unsatisfactory for a variety of reasons. One material which has been experimented with extensively is felt. Felt has the disadvantage of absorbing liquids and this will change its permeability during operation. Such a material would be wholly unsatisfactory for current undersea applications. Furthermore, felt must be made in varying thicknesses in order to obtain varying permeability, and structural limitations are encountered in attempting to mount it within a thin foil and to make it replaceable with other variable permeability members wherein the permeability varies in a different manner.

Sintered steel has also been employed experimentally as a variable permeability material, but it is not satisfactory due to its high cost and excessive weight which make it commercially unfeasible. In addition, sintered steel has poor fatigue strength. Furthermore, accurate control of the permeability of sintered steel within a range of plus or minus 100% is not possible even if cost were not a factor.

Also, compressed resin bonded mats of Fiberglas have been used as a variable permeability material, but this material has the disadvantage of not possessing sufficient structural strength or surface durability for practical operation. Woven wire cloth has been tried but has not been satisfactory due to its poor surface smoothness and inability to be formed to a curved shape with permeability control to the accuracy required.

A porous material useful for boundary layer control can also be utilized in combustion chamber environments, in fluidizing conveyors and in structures which must withstand the shock of a blast wave.

The principal object of the present invention is to provide a strong, light weight boundary layer control structure well adapted to provide either uniform or variable permeability.

One feature of the present invention is the provision of a novel permeable member comprising a porous surface member and a member made up of a plurality of fluid passageways wherein the passageways are joined at one end thereof to one face of the surface member and communicate with the pores of the surface member, the axes of adjacent passageways being aligned substantially parallel whereby fluid can pass through said pores and said passageways at a predetermined fluid flow rate.

Another feature of the present invention is the provision of a permeable member of the first mentioned feature provided with a gradient permeability thereacross created by changes in the porosity of the surface member.

Another feature of the present invention is the provision of a permeable member of the first mentioned feature wherein the cross sectional area of certain of the passageways varies with respect to the cross sectional area of other of the passageways in a predetermined manner to provide the permeable member with a gradient permeability.

Another feature of the present invention is the provision of a variable permeability member comprising a member made up of a plurality of fluid passageways, the axes of adjacent passageways being substantially parallel and the cross sectional area of certain of the passage ways varying with respect to the cross sectional area of other of the passageways in a predetermined manner whereby the flow rate of a fluid passing through the certain and other passageways varies in a desired manner.

Another feature of the present invention is the provision of a permeable member comprising a member made up of a plurality of fluid passageways, the axes of the adjacent passageways being substantially parallel and making an acute angle with the direction of fluid flow across the adjacent surface of the permeable member whereby when fluid is flowing past the permeable member constituting a portion of the surface of a vehicle in motion less suction power is required to move fluid through the passageway than through passageways whose axes are perpendicular to the surface of the vehicle.

Figure 2:
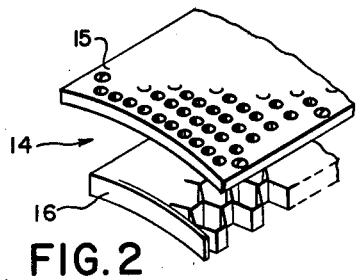
Figure 3:
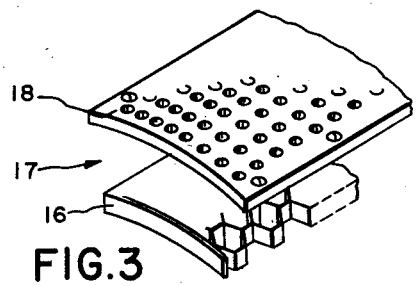
Figure 4:
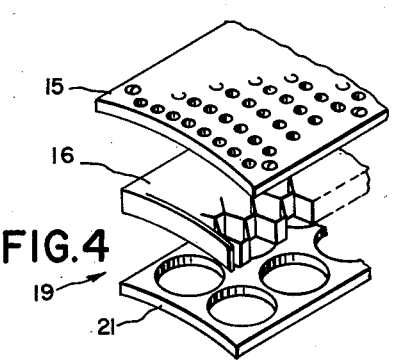
Figure 5:
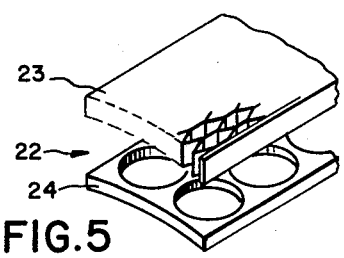
Figure 6:
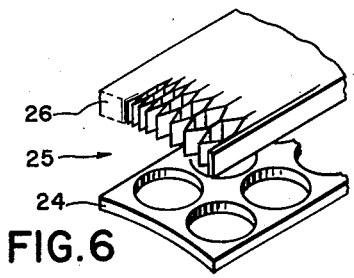
Figure 7:
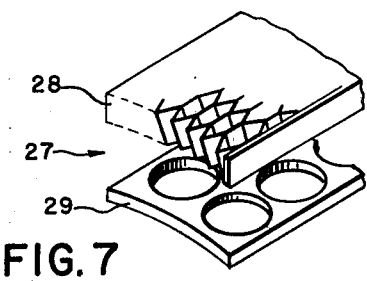
Figure 8:
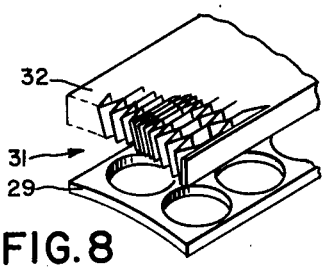
Figure 9:
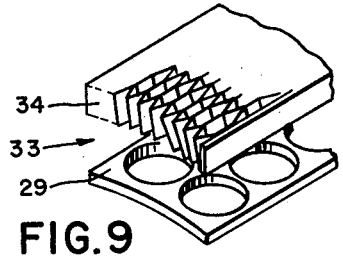
Figure 10:
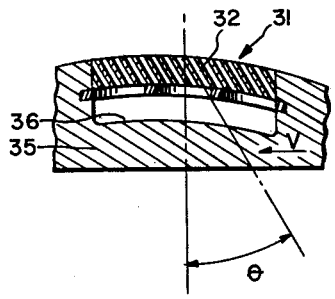
Figure 11:
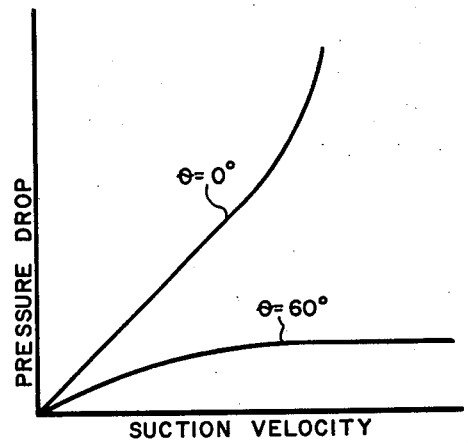
Figure 12:
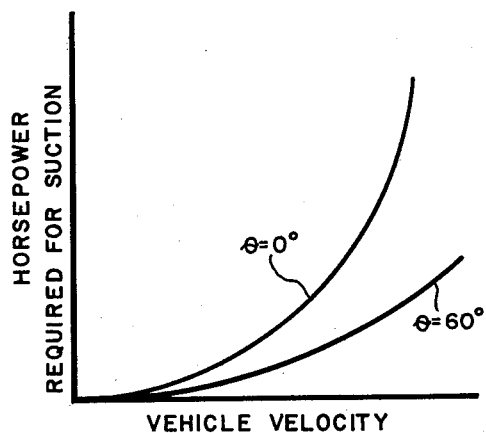
Figure 13:
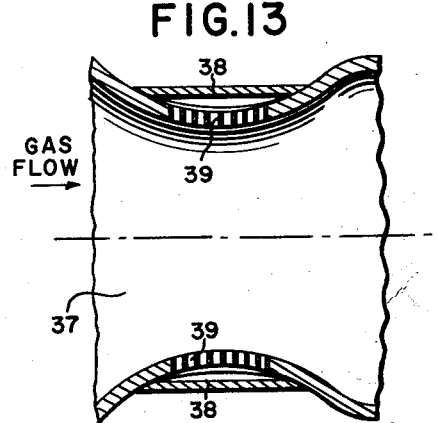

Other features and advantages of the present invention will become more apparent upon a perusal of the following specification taken in connection with the drawings wherein:

FIG. 1 is a perspective view of a portion of a vehicle provided with a permeable member according to the present invention, FIG. 2 is an enlarged exploded view of the permeable member shown in FIG. 1, FIG. 3 is an exploded view of structure similar to that of FIG. 2 and provided with a gradient permeability, FIG. 4 is an exploded view of an alternative permeable member according to the present invention, FIGS. 5 and 6 are exploded views, partially in section, of other alternative structures for permeable members according to the present invention, FIGS. 7, 8 and 9 are exploded views, partly in section, of still other alternative structures for permeable members according to the present invention, FIG. 10 is a cross sectional view of a portion of a vehicle provided with a porous material according one embodiment of this invention, FIG. 11 is a graph showing the pressure drop through a permeable member plotted against the suction velocity for different permeable members, FIG. 12 is a graph showing horsepower required for suction plotted versus vehicle velocity for different permeable members, and FIG. 13 is a partial longitudinal cross sectional view of a permeable member in another structure.

While porous materials according to the present invention are especially adaptable for boundary layer control they are also useful in combustion chamber environments, in fluidizing conveyors and for blast wave protection. For the sake of convenience, the following description will only be directed toward porous materials as utilized in boundary layer control.

Referring now to FIG. 1, there is shown a portion 11 of a vehicle provided with a permeable member according to the present invention. The vehicle can either be an aircraft, an air or underwater missile, or an underwater vehicle such as a submarine. The present invention applies to any vehicle traveling in any medium wherein boundary layer control can become important. The portion 11 is provided with a conduit 12 formed therein adjacent the skin 13 thereof and through which suction is provided by means of a pump or the like, not shown. The upper portion of the conduit 12 is covered by a permeable material 14 the outside surface of which constitutes part of the skin of the vehicle. The porous material 14 may be fixed to the vehicle by any convenient means as, for example, screws 10 which pass through the outer surface of the porous material and screw into threaded holes in the vehicle.

Referring now to FIG. 2 which is an exploded view of the porous material 14 of FIG. 1, the porous material 14 constitutes a 2-ply structure including a porous surface member 15 and a member 16 made up of a plurality of fluid passageways wherein the axes of adjacent passageways are substantially parallel. One surface of the member 16 is joined to the inner face of the porous surface member 15 with the passageways of the member 16 communicating with the pores of the surface member 15. By closely controlling the hole sizes and/or hole spacings in the surface member 15 a desirable permeability can be provided. Typical hole diameters are in the range of from about .015 to .0015 inch. These holes usually must be made by etching or electro-deposition since they are too small to be punched.

The surface member 15 and the member 16 can be made out of any strong, light weight material such as aluminum, but for high temperature use stainless steel can be used.

The member 16 is a cellular honeycomb structure which, by itself, is not sufficiently rigid to support itself, but when the member 16 is provided with the surface member 15 the combination forms a rigid structure. The honeycomb can either be the "preformed cell" type of honeycomb or the "expanded cell" type. Honeycomb members of this nature are flexible enough so that they can be shaped to conform to any desired surface contour. Thus, porous materials constructed according to the present invention can easily be incorporated into any portion of the skin of a vehicle wherein boundary layer control is desired. The passageways in the honeycomb member can be round, hexagonal, or any other shape conveniently fabricated.

Referring now to FIG. 3, there is shown the manner in which a gradient permeability porous material 17 can be provided. In a porous surface member 18 the hole sizes and/or hole spacings are varied in the desired manner to provide a gradient permeability for the porous material. Gradient permeability porous materials according to the present invention can be utilized for a portion of a vehicle surface or for the entire vehicle skin.

Referring now to FIG. 4, there is shown an alternative embodiment of the present invention showing a porous material 19 wherein the porous surface member 15 is provided on one side of the member 16 and a backing member 21 is provided on the other side to produce a rigid sandwiched structure. The backing member 21 is provided with extremely large holes communicating with the passageways in the member 16 so that the permeability of the sandwich structure is determined only by the porous surface member 15, and the backing layer 21 adds strength to the structure. For typical applications the open area of the backing sheet 16 is between 40 and 60 percent of its total area.

The structure of FIG. 4 can be provided with a backing member whose hole size and/or spacing also aids in establishing the desired permeability. In order to provide a gradient permeability as shown in FIG. 3, the hole size and/or hole spacings in either or both the porous surface member 15 and the backing member 21 can be varied to achieve the desired gradient permeability. Also, the sandwich arrangement shown in FIG. 4 can be reversed so that the large hole sheet 21 is on the exterior surface of the vehicle and the member 15 is on the interior surface of the member 16.

Referring now to FIG. 5 wherein an alternative embodiment of the present invention is shown, a porous material 22 is provided which includes a porous surface 23 made up of a plurality of fluid passageways with the axes of adjacent passageways being substantially parallel. The size of the passageways is extremely small and a desired permeability can be achieved by varying the cross sectional area of the passageways. A backing member 24 provided with extremely large holes is fixedly secured to the back of the porous surface member 23 to provide strength to the porous material.

The porous surface member 21 can be a "preformed cell" type of honeycomb but is preferably made of partially expanded "expandable cell" type of honeycomb. By using the "expandable cell" type of honeycomb the completely compressed honeycomb before expansion can be expanded until the desired permeability is achieved.

Referring now to FIG. 6, there is shown another porous material 25 wherein the porous surface member 26 is provided with a gradient permeability by varying the cross sectional area of certain of the fluid passageways in the surface member with respect to the cross sectional area of others. These porous materials 22 and 25 can be fabricated by utilizing a simple flow metering device pressed against the expanding honeycomb to indicate when the proper expansion has been achieved to give the desired permeability. The honeycomb can then be "fixed" as required. Also the porous materials can be fabricated by applying a predetermined tension to all or certain portions of the unexpanded honeycomb to produce uniform or gradient permeabilities, respectively.

"Expanded cell" honeycomb can be expanded from its original compressed shape to an effective open area of about 0.25 to approximately 10% of the open area of the conventional expanded honeycomb, and such expanded honeycomb will provide a complete range of permeability values sufficient for substantially all aerodyanamic and hydrodynamic applications. For a typical hydrodynamic application of the porous member shown in FIG. 5 the shape of the openings in the exterior surface is generally that of a slot rather than a circle with each opening being on the order of a few thousandths of an inch wide. The length of the passageway is several times larger than the width, but the thickness of this porous surface member 23 need not exceed one quarter inch for most applications.

The shape of the openings into the passageways in the partially expanded honeycomb members 23 and 26 in FIGS. 5 and 6 offers unique advantages for aerodynamic and hydrodynamic applications. By aligning the porous members 23 and 26 such that the flow along the surface is normal to the width (or small dimension of the channels, the ratio of the hole size to the boundary layer thickness can be made small. With selective design this ratio can be much less than 1.0. Furthermore, the surface will act as a series of parallel slots rather than an array of spaced round holes. In certain drag type applications there is evidence that the former type of surface is more advantageous.

Referring now to FIG. 7, there is shown a 2-ply porous material 27 wherein the outer surface comprises a porous member 28 made up of a plurality of fluid passageways with the axes of the adjacent passageways being substantially parallel and the axes of the adjacent passageways at at least one end thereof making an acute angle with the direction of the fluid flow across the adjacent surface of the permeable member. The angle between the axes of the passageways and the normal to the surface can be from 0° to about 70°. At the high end of this range as this angle increases in size fabrication problems arise and the increased length of the passageways gives adverse flow effects. The porous material 27 is provided with a backing member 29 which has large holes therein not to obstruct the flow of fluid through the porous surface member 28 but to add rigidity thereto.

Gradient permeability can be provided to the porous material 27 as shown in FIG. 8 wherein a porous material 31 is provided with a porous surface member 32 which has slant passageways therein similar to the surface member 28 in FIG. 7 except that the cross sectional area of the passageways varies in a predetermined manner to provide a gradient permeability across the material 31. Gradient permeability can be achieved in another manner shown in FIG. 9. As shown in FIG. 9 the angle which certain fluid passageways make with the direction of fluid flow across the vehicle can be varied with respect to the angle made by other passageways.

The effect of slanting the angle of the fluid passageways can best be explained with respect to FIGS. 10, 11 and 12. In FIG. 10 is shown a cross sectional view of a portion vehicle 35 traveling with a velocity V in a medium. A porous material 31 of the type shown in FIG. 8 covers the top of a conduit 36 providing communication between the boundary layer and the conduit 36. The pressure outside the vehicle is referred to as $P_1$ and the pressure inside the conduit 36 is referred to as $P_2$. Normally, as shown in FIGS. 2–6, the axes of the passageways in the porous material 31 are aligned with the normal to the porous material 31 to provide the greatest strength possible to withstand the pressure differential between the outside and the inside of the vehicle, but as shown in FIGS. 7–9 the axes of the passageways can be inclined at an angle $\theta$ with respect to the normal to the surface to reduce suction power requirements for boundary layer control.

For a surface moving in one fluid and provided with a porous area extending generally in the direction of fluid flow, slanting the axes of the fluid passageways in the porous material with respect to the normal to the surface has the effect of reducing the pressure drop required for a given quantity of boundary layer flow. Not only can the effect of the slanted passageways reduce the required pressure drop but it can also actually create a positive internal pressure. Then the quantity of fluid passes inwardly through the porous material although the pressure drop is negative in sign. Under such circumstances the slanted passageways can be considered to act as a device (so-called Coanda effect) to deflect the fluid stream direction into the passageway with a conversion of kinetic to potential energy. Such a suction system would be self generating. A quantity of boundary layer fluid can now flow through the porous skin with a low negative pressure drop whereas an equal quantity of fluid flowing through a porous skin with passageways aligned normal to the surface would require a large positive pressure drop. Curves showing the pressure drop plotted against the suction velocity for normal and slant hole passageways in an aerodynamic application are shown in FIG. 11. The horsepower required for suction is less for the slant-hole structure since it is not necessary to initially create as great a pressure drop. This is shown in FIG. 12 wherein the horsepower required for suction is plotted against vehicle velocity for the same conditions illustrated in FIG. 11.

Another typical use for the porous materials of the present invention is shown in FIG. 13. FIG. 13 is a longitudinal cross sectional view of a rocket nozzle 37 provided with porous material in the constricted region of the nozzle. A fluid is passed from a reservoir 38 through a porous material 39 which is similar to the material shown in FIG. 5 in order to cool the surface of the restricted portion of the nozzle 37 and down stream of the nozzle.

Although in most applications the member provided with the plurality of passageways is of constant thickness thereby simplifying the fabrication and support of the porous material, under certain conditions and length of the passageways can be varied to provide a gradient permeability.

Since many changes and modifications can be made without departing from the spirit of the invention this description is to be taken as purely illustrative and not in a limiting sense.

What is claimed is:

1. A permeable member comprising a porous surface layer of controlled porosity and a plurality of fluid passageways, said passageways being joined at one end thereof to one face of said surface layer and communicating with the pores of said surface layer with the axes of adjacent passageways being substantially parallel whereby fluid can pass through said pores and said passageways at a predetermined fluid flow rate, the length of certain of said fluid passageways varying with respect to the length of other fluid passageways in a predetermined manner to provide a permeable member with a permeability gradient across the surface thereof.

2. A permeable member comprising a porous surface layer of controlled porosity and a plurality of fluid passageways, said passageways being joined at one end thereof to one face of said surface layer and communicating with the pores of said surface layer with the axes of adjacent passageways being substantially parallel whereby fluid can pass through said pores and said passageways at a predetermined fluid flow rate, the pores of said surface layer being of varying size and the length of certain of said fluid passageways varying with respect to the length of other of said fluid passageways in a predetermined manner to provide a permeability gradient across the surface thereof.

3. A permeable member comprising a porous surface layer of controlled porosity and a plurality of fluid passageways, said passageways being joined at one end thereof to one face of said surface layer and communicating with the pores of said surface layer with the axes of adjacent passageways being substantially parallel whereby fluid can pass through said pores and said passageways at a predetermined fluid flow rate, the length and cross sectional area of certain of said passageways varying with respect to the length and cross sectional area of other of said passageways in a predetermined manner whereby the flow rate of a fluid passing through said certain and said other passageways varies in a desired manner.

4. A permeable member comprising a porous surface layer of controlled porosity and a plurality of fluid passageways, said passageways being joined at one end thereof to one face of said surface layer and communicating with the pores of said surface layer with the axes of adjacent passageways being substantially parallel whereby fluid can pass through said pores and said passageways at a predetermined fluid flow rate, the pores of said surface layer being of varying size and the length and cross sectional area of certain of said passageways varying with respect to the length and cross sectional area of other of said passageways in a predetermined manner whereby the flow rate of a fluid passing through said certain and said other passageways varies in a desired manner.

5. A permeable member comprising a porous surface layer of controlled porosity and a plurality of fluid passageways, said passageways being joined at one end thereof to one face of said surface layer and communicating with the pores of said surface layer with the axes of adjacent passageways being substantially parallel whereby fluid can pass through said pores and said passageways at a predetermined fluid flow rate, the axes of said fluid passageways at at least one end thereof making an acute angle with the normal to the direction of fluid flow across the adjacent surface of said member, whereby when fluid is flowing past said member constituting a portion of the surface of a vehicle in motion less power is required to move fluid through said passageways than through passageways whose axes are perpendicular to the surface of such a vehicle, the pores of said surface layer being of varying size, and the length and cross sectional area of certain of said passageways varying with respect to length and cross sectional area of other of said passageways in a predetermined manner whereby the flow rate of a fluid passing through said certain and said other passageways varies in a desired manner.

6. A vehicle designed to be driven through an enveloping fluid including an outer skin over which turbulence is likely to occur during forward motion of the vehicle, at least one permeable partially expanded expandable cell honeycomb member positioned in said skin and having one surface exposed to the fluid, said honeycomb member including a plurality of open ended substantially unobstructed cell passageways, one open end of said passageways being at said exposed surface of said honeycomb member and providing the passageways direct communication with the enveloping fluid, the axes of adjacent passageways being substantially parallel and the cross sectional area of certain of said passageways varying with respect to the cross sectional area of other of said passageways to product a permeability gradient across the skin of the vehicle whereby the flow rate of a fluid passing through said certain and said other passageways varies in a given manner and a conduit within the vehicle communicating with said passageways for passing boundary layer fluid drawn into said passageways whereby turbulence over said skin is reduced.

7. A vehicle designed to be driven through an enveloping fluid including an outer skin over which turbulence is likely to occur during forward motion of the vehicle; at least one permeable member positioned in said skin and having one surface exposed to the fluid, said member comprising a plurality of open-ended substantially unobstructed fluid passageways, one open end of said passageways located at said exposed surface of said permeable member and providing direct communication between the fluid and said passageways, the axes of adjacent passageways being substantially parallel and the axes of said passageways at at least said one open end thereof making an acute angle with the normal to the direction of fluid flow across the adjacent surface of said member; and a conduit within the vehicle communicating with said passageways for passing boundary layer fluid drawn into said passageways whereby when the vehicle is driven through the enveloping fluid turbulence over said skin is reduced and less power is required to move fluid through said passageways than through passageways whose axes are perpendicular to the surface of such a vehicle.

8. The vehicle of claim 7 wherein said permeable member is a partially expanded expandable cell honeycomb member, the cells of which define the passageways in said member.

References Cited in the file of this patent
UNITED STATES PATENTS

| | | |
|---|---|---|
| 2,464,663 | Zingg | Mar. 15, 1949 |
| 2,742,247 | Lachmann | Apr. 17, 1956 |
| 2,843,341 | Dannenberg | July 15, 1958 |